United States Patent [19]

Hilton

[11] 4,110,010
[45] Aug. 29, 1978

[54] GANGED HELIOSTAT

[76] Inventor: Richard D. Hilton, Rte. 2, Box 381-A, King George, Va. 22485

[21] Appl. No.: 813,658

[22] Filed: Jul. 7, 1977

[51] Int. Cl.² ............................. G02B 5/08; G02B 7/18
[52] U.S. Cl. .................................................... 350/292
[58] Field of Search ....................... 350/292, 299, 289; 353/3; 126/270, 271

[56] References Cited

U.S. PATENT DOCUMENTS

| | | | |
|---|---|---|---|
| 1,111,239 | 9/1914 | Smelsek | 350/292 |
| 2,471,954 | 5/1949 | Harvey | 350/292 |
| 3,466,119 | 9/1969 | Francia | 353/3 |
| 4,056,313 | 11/1977 | Arbogast | 350/299 |

*Primary Examiner*—Jon W. Henry
*Attorney, Agent, or Firm*—Watson, Cole, Grindle & Watson

[57] ABSTRACT

A device for tracking the apparent motion of the sun and reflecting and thereby concentrating rays from the sun to a fixed target area is disclosed. The device is what may be described as a ganged heliostat, an array of heliostats controlled by a single mechanism such that each heliostat is able to redirect rays of the sun toward a common fixed target area over the course of a day and thereby concentrate rays of the sun received over a large area to a much smaller area.

10 Claims, 7 Drawing Figures

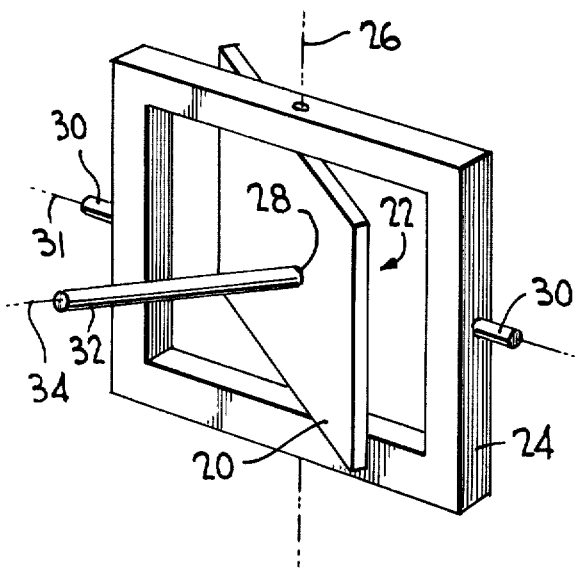
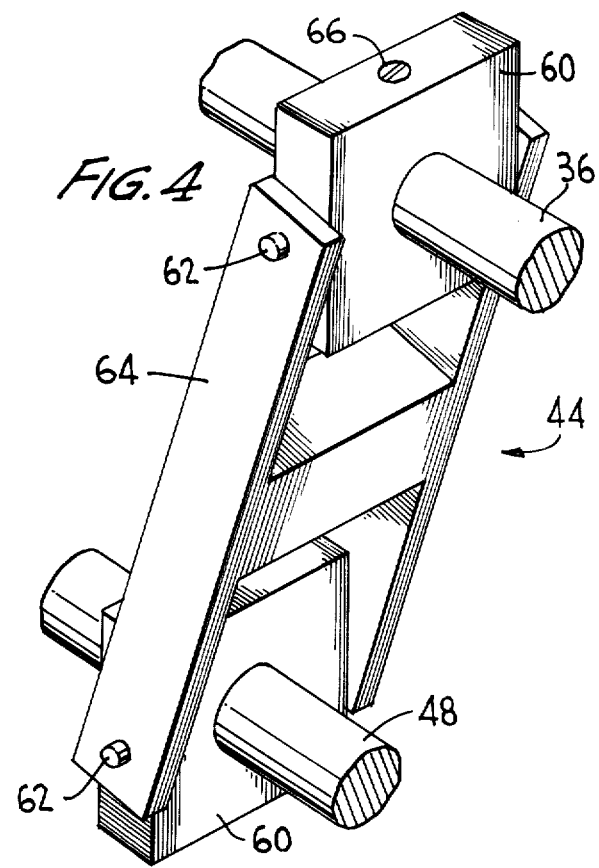
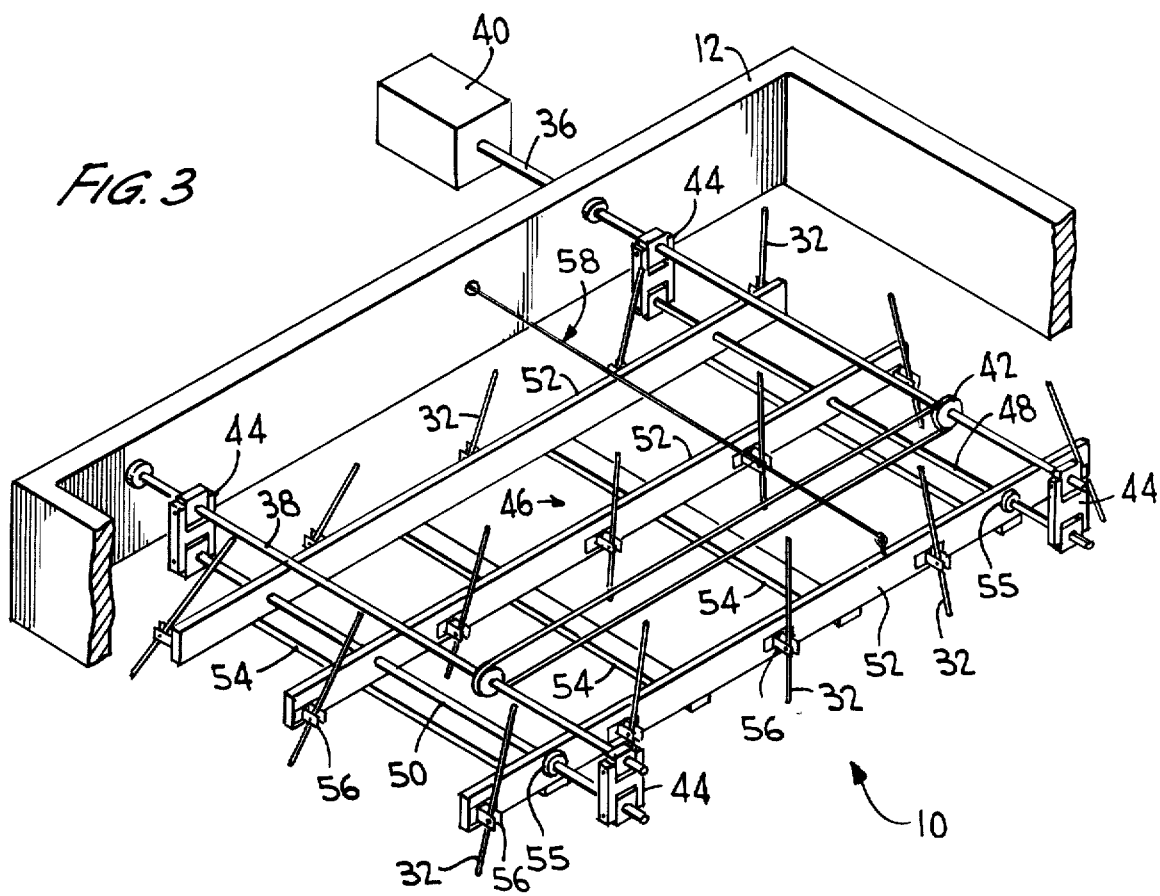

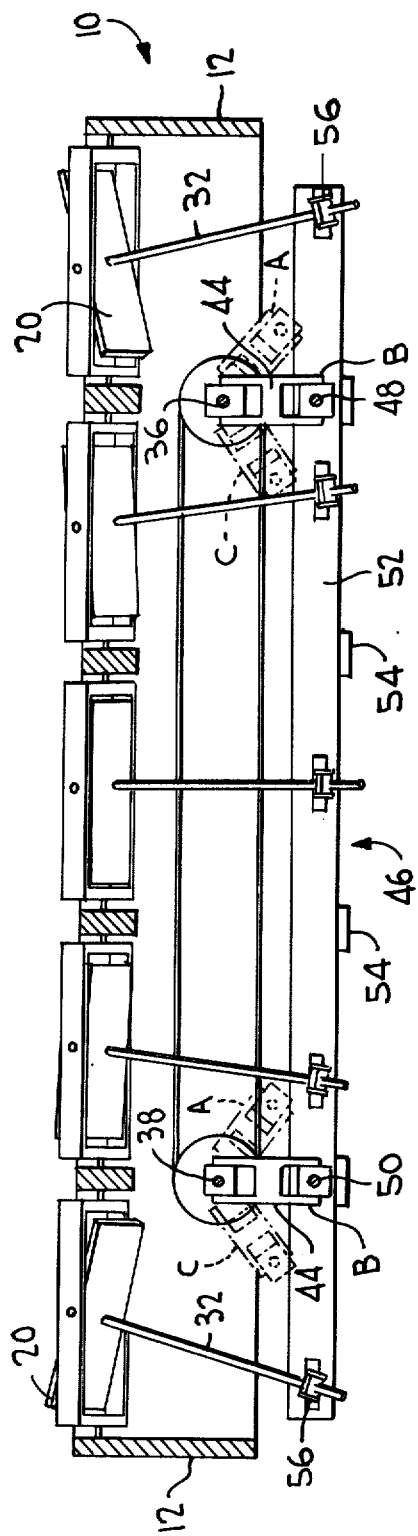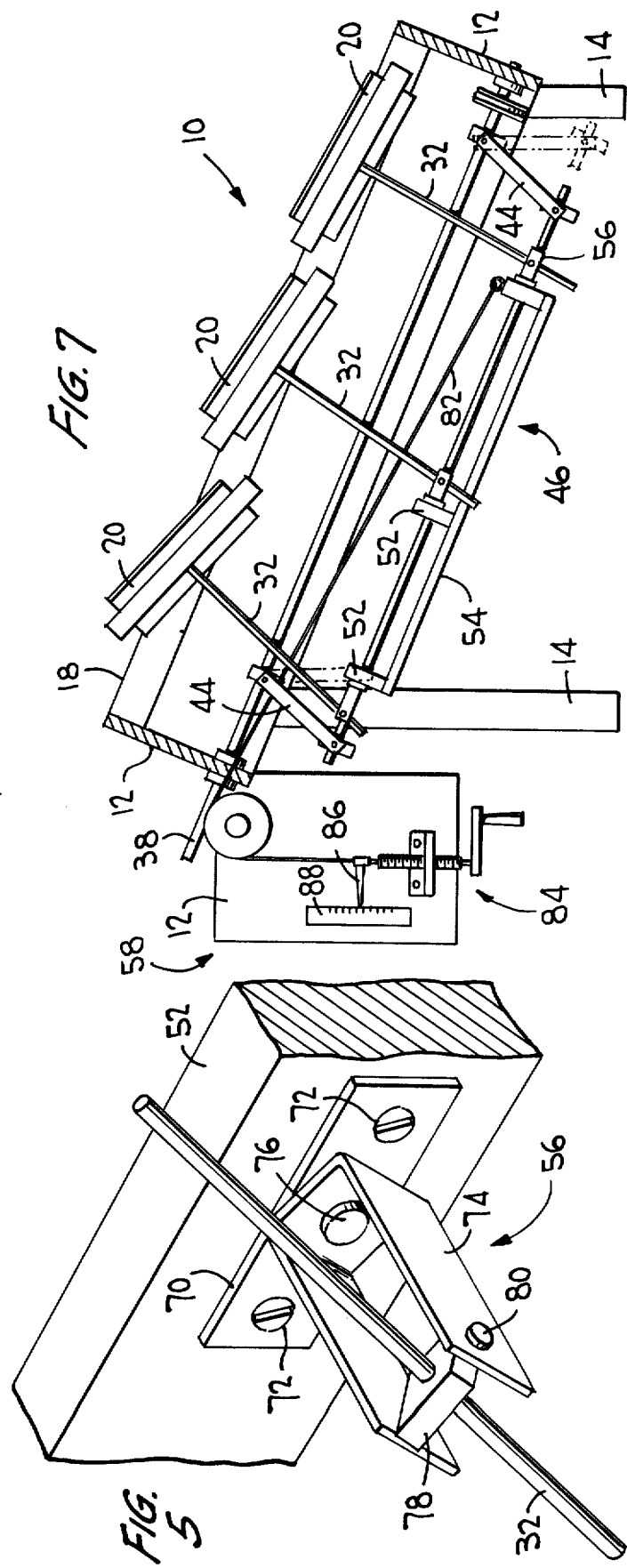

GANGED HELIOSTAT

BACKGROUND OF THE INVENTION

The present invention relates to a device for tracking the apparent motion of the sun across the sky and concentrating the radiant energy received from the sun on a fixed target area. More particularly, the invention relates to what may be described as a "ganged heliostat", that is, an array of heliostats controlled by a single mechanism such that each heliostat redirects rays of the sun toward a common fixed target area and thereby concentrates the rays of the sun received over a large area to a smaller target area.

The efficient utilization of solar energy is a problem receiving widespread attention in industry today. One potential solution is in the development of solar cells by the semi-conductor and allied industries for converting the radient energy of the sun into electrical power. Most, if not all, conventional solar cells are quite expensive and in order to be economically viable, they must have a high efficiency. One method of improving the efficiency of solar cells is by concentrating incident sunlight received over a large area onto the cells. Another method is to have the cell or associated equipment for the cell track the apparent motion of the sun across the sky so as to maximize the amount of incident sunlight received per cell unit area over the course of a day.

While various devices are known in the art for concentrating sunlight on a particular solar device and/or for tracking the apparent motion of the sun, such mechanisms have various inherent disadvantages such as being complex, expensive, difficult to maintain and prone to gradually work out of proper adjustment for maximum utility. Examples of these known devices are those disclosed in U.S. Pat. Nos. 913,051 to Pope, 1,219,372 to Butterfield, 1,938,003 to Arthuys et al, 1,876,428 to Arthuys et al, 2,022,144 to Nicholson, 2,135,997 to Arthuys, 2,712,772 to Trombe, 3,656,844 to Botskor, and 3,951,510 to Lloyd.

It is therefore an object of the present invention to provide a device for tracking the apparent motion of the sun across the sky and for concentrating the rays received therefrom on a fixed target area.

Another object of the present invention is to provide a device which is relatively uncomplicated, requires a minimum amount of maintenance, is relatively inexpensive to manufacture and requires relatively small amounts of energy for operation.

Yet another object of the present invention is to provide a device which is able to be adjusted so to compensate for the changes in the apparent motion of the sun from day to day.

The invention in its broadest aspect comprises a device adapted for tracking the motion of the sun and reflecting and thereby concentrating rays of the sun to a fixed target area which includes at least two members each having a reflective surface and being rotatably mounted in a frame on an axis which passes through the center point of the member, each frame being rotatably mounted in a common support on an axis which passes through the center point of the member and is at a right angle to the axis of the member, a control rod having a longitudinal axis attached to each member such that the axis of the control rod is normal to the reflective surface of the member and passes through the center point of the member, guide frame means in engagement with each control rod, driving means for moving the guide frame such that each member rotates about one axis and is thereby capable of tracking the apparent motion of the sun, and adjusting means for moving the guide frame means such that each member rotates relative to the other axis.

Further objects, advantages, and features of the present invention will become more fully apparent from a detailed consideration of the arrangement and construction of the constituent parts as set forth in the following specification taken together with the accompanying drawing.

DESCRIPTION OF THE DRAWING

In the drawing

FIG. 2 is a perspective view of a member and frame which form a part of the device shown in FIG. 1;

FIG. 3 is a perspective view of the device of FIG. 1 with portions of the device cut away;

FIG. 4 is a detailed perspective view of an offset assembly shown in FIG. 3;

FIG. 5 is a detailed perspective view of a swivel assembly shown in FIG. 3;

FIG. 6 is a sectional view of the device of FIG. 1 taken along line 6—6;

FIG. 7 is a sectional view of the device of FIG. 1 taken along line 7—7.

DETAILED DESCRIPTION OF THE PREFERRED EMBODIMENT

Figure 1:
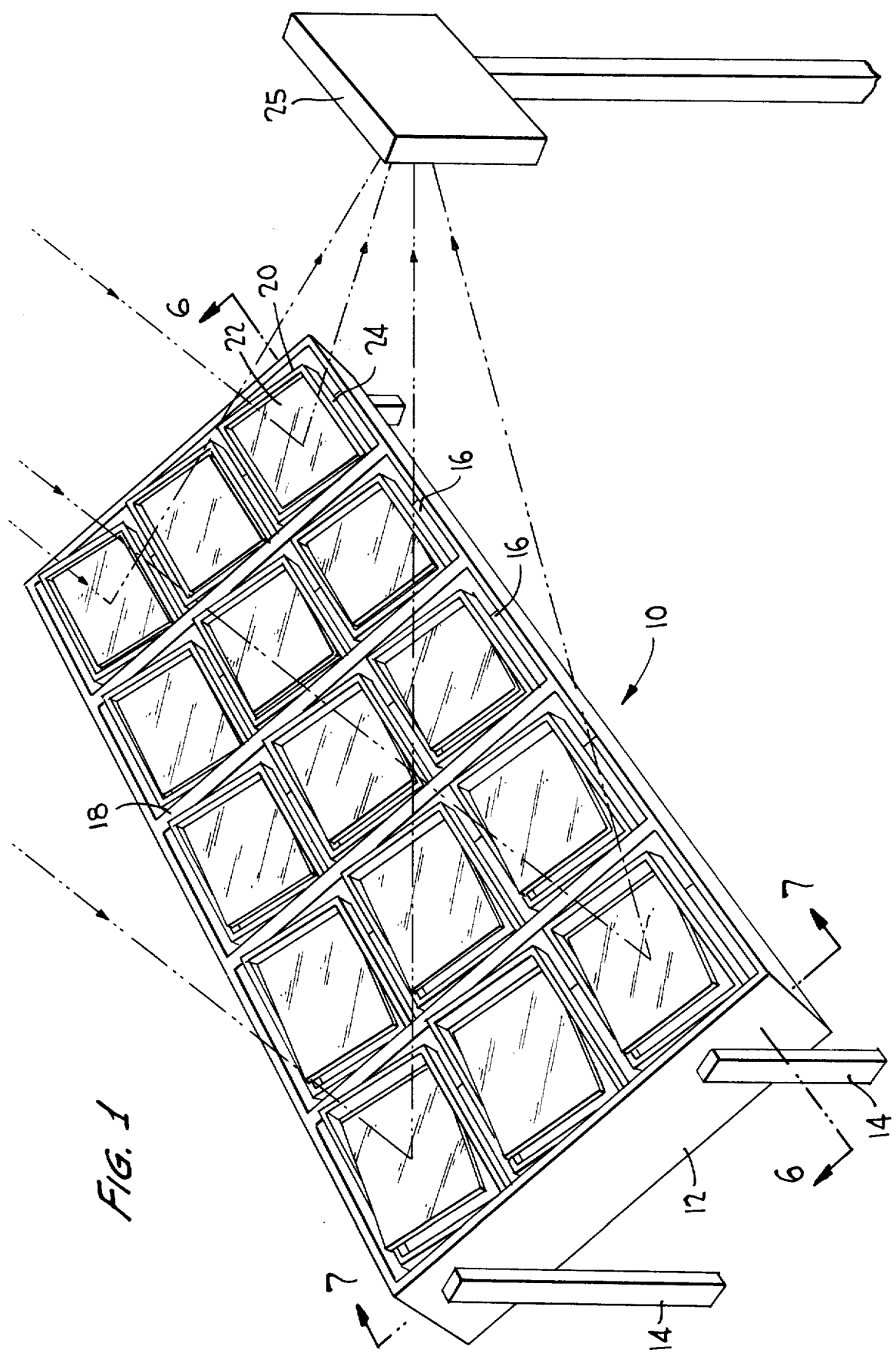
FIG. 1 is a perspective view of a device in accordance with the present invention.

Referring now to FIG. 1, there is shown a perspective view of a device 10 in accordance with the concepts of the present invention. Device 10 includes a support frame 12 on legs 14 having a major surface 18 inclined with respect to horizontal. The support frame 12 is of a generally rectangular configuration and has a plurality of square shaped apertures 16 on surface 18. Mounted for rotation within each aperture 16 is a member 20 having a planar reflective surface 22 such as a mirror or the like and a frame 24 about the member. The interrelationship among member 20, frame 24 and support frame 12 is more clearly shown in FIG. 2.

In operation, device 10 is adapted to track the motion of the sun and reflect and thereby concentrate rays from the sun to a common fixed target area, for example, a fluid heater or a solar collector 25 containing solar cells as shown in FIG. 1. Each reflective surface 22 of the respective members 20 is positioned to be in a different plane so as to direct the rays of the sun toward the collector 25. As is apparent, device 10 is capable of directing the sunlight incident on a large area to a much smaller area where solar energy devices such as solar cells may be used to their full advantage.

As the sun apparently progresses across the sky during a day, the device 10 is capable of shifting the plane of each of the reflecting surfaces 22 of the members 20 so that the rays of the sun are continually reflected toward the collector 25. The capability of the device 10 to have the plane of each reflective surface 22 of the members 20 changed with respect to the support frame 12 is partially shown in FIG. 2 where the member having the reflective surface is rotatably mounted within frame 24. The axis 26 about which member 20 is able to rotate with respect to the frame 24 passes through the center point 28 of the member. Frame 24 includes pivot mounts 30 which are on an axis 31 which also passes through the center point 28 of the member 20. Pivot mounts 30 are received by apertures in the support frame (not shown) such that the frame 24 is pivotly mounted therein.

Attached to member 20 is a control rod 32 having a longitudinal axis 34. The control rod 32 is positioned such that its axis 34 is normal to the surface of member 20 and passes through center point 28 of the member. The length of control rod 32 is not believed to be critical, however, the longer the control rod, the more precise is the control that can be exercised over the member 20.

FIG. 3 is a cut-away view of the device 10 of FIG. 1 which illustrates a mechanism for controlling the movement of the members 20 of the device 10. Extending through both sides of support frame 12 are shafts 36 and 38 which are able to rotate about their respective longitudinal axes. Shaft 36 is driven by motor 40 and rotation of shaft 36 is transferred to shaft 38 by a suitable means such as by the shown cable and pulley arrangement 42.

Suspended from shafts 36 and 38 are four offset assemblies 44 which in turn support the guide frame 46. The construction of an offset assembly 44 is more clearly shown in FIG. 4. The guide frame 46 includes shafts 48 and 50, each having a longitudinal axis parallel to the axis of shafts 36 and 38. Shafts 48 and 50 each pass through longitudinal members 52 of guide frame 46 which are securely attached to cross members 54. Shafts 48 and 50 are able to rotate within longitudinal members 52 but are restrained from axial movement by bushings 55 on each shaft.

Located on the longitudinal members 52 of the guide frame 46 are a plurality of swivel assemblies 56, each swivel assembly adapted to engage a control rod 32. The structure of a swivel assembly 56 is more clearly shown in FIG. 5. Also attached to guide frame 46 is adjusting means 58 for shifting and then fixing the guide frame 46 in directions parallel to the longitudinal axes of shafts 48 and 50. One embodiment of an adjusting means 58 is shown in FIG. 7.

FIG. 4 is a detailed perspective view of offset assembly 44 shown in FIG. 3. An offset assembly may be defined as an assembly which transfers rotational motion of the driven shaft 36 or 38 to another shaft 48 or 50 and allows for axial movement of the shaft 48 or 50 relative to the driven shaft. In this embodiment, offset assembly 44 comprises blocks 60, each pivotably mounted by pins 62 within offset frame 64. Shaft 36 extends through one of the blocks 60 and is securely mounted therein by set screw 66. Shaft 48 extends through the other block 60 and is also securely mounted therein in the same manner. As is apparent, when shaft 36 is caused to rotate by drive motor 40, this rotational movement will be transferred by offset assembly 44 to shaft 48 and thus to guide frame 46. In addition, offset assembly 44 allows shaft 48 and thus guide frame 46 to be shifted in an axial direction relative to shaft 36.

FIG. 5 is a detailed perspective view of swivel assembly 56 shown in FIG. 3. A swivel assembly may be defined as an assembly which allows motion of the guide frame, considering the guide frame 46 as a plane, in directions within the plane to be transferred to the control rod 32 but motion normal to the plane is not transferred to the control rod. In this embodiment, swivel assembly 56 comprises base plate 70 attached to longitudinal member 52 by screws 72, a yoke member 74 attached to the base plate by pivotal joint 76, and swivel block 78 pivotably mounted in yoke member by pins 80. Located in the center of swivel block 78 is a bore through which a control rod 32 passes. Control rod 32 may rotate with respect to swivel block 78 and may also slide longitudinally within the block.

The operation of the device 10 in accordance with the present invention may be more clearly understood by reference to FIGS. 6 and 7. FIG. 6 is a cross-sectional view of the device 10 of FIG. 1 taken along line 6—6 and FIG. 7 is a cross-sectional view of the device 10 of FIG. 1 taken along line 7—7.

In FIG. 6, offset assemblies 44 are shown in various positions corresponding to various degrees of rotation of shafts 36 and 38 during an operational cycle of the device 10. Position A, shown in phantom lines, indicates the position of offset assembly 44 during the initial part of the cycle of device 10. Position B represents approximately the midpoint in the cycle and position C represents a final point in the cycle. As is apparent from FIG. 6, at each position of the offset assemblies 44, guide frame 46 and thus the members 20 are displaced to different positions as shafts 36 and 38 rotate thus allowing the device to track the apparent motion of the sun across the sky.

FIG. 7 illustrates the function of adjusting means 58 to the operation of the device 10. In this embodiment, adjusting means 58 comprises a control member such as a cord or cable 82 having one end suitably attached to guide frame 46 and the other end attached to crank assembly 84 mounted on a portion of support frame 12. By appropriate adjustment of the crank assembly 84, the effective length of cable 82 is either lengthened or shortened. To facilitate precise adjustment of the cable 82, a pointer 86 is attached to the cable 82 and a read-out scale 88 fastened to a portion of the support 12.

Because of the upper or major surface 18 of support frame 12 is at an angle from horizontal, offset assemblies 44 will be in the position shown by the phantom lines if no tension is applied to cable 82. By shortening the effective length of cable 82, offset assembly 44 and guide frame 46 will assume the position shown in heavy lines. Thus by appropriate adjustment of the adjusting means 58, the angle of the reflective surfaces of members 20 relative to horizontal can be fixed so as to properly reflect rays from the sun to the target area.

The above described device 10 operates as a recognition of the following general principles. The apparent motion of the sun during a day is, to an observer on a particular point, a circle. On the day of an equinox, the apparent path of the sun is along a great circle beginning at due east and ending at due west and having an angular rate of travel of one revolution per 24 hours. This apparent path of the sun on a day of an equinox lies in a plane called the "equatorial plane". On days other than an equinox, the sun appears to move in non-great circles in planes parallel to the equitatorial plane.

The axis of the circle representing the apparent path of the sun on the day of an equinox corresponds to the observer's line of sight toward the North Star (Polaris). Thus the device as shown in FIG. 1 may be positioned such that the edges of the support frame 12 are directed toward the North Star and the major surface 18 is therefore perpendicular to the equitorial plane.

The angular distance of circles representing the apparent motion of the sun or non-equinox days from the equitorial plane is commonly known as the declination angle. The declination angle varies more or less sinusoidally during a year between limits of about $\pm$ 23-$\frac{1}{2}$°. Thus by knowing the declination angle for a particular day of the year, the device may be set to accurately track the apparent motion of the sun by adjusting the adjustment means for the proper setting for that day. While the declination angle changes very slightly during the course of a day, these changes are not of sufficient magnitude to adversely affect the operation of the device.

For general purposes, the apparent rate of travel of the sun can be considered to be one revolution per 24 hours. However, there is actually a very slight variation in the angular rate of the sun from one revolution per 24 hours. While in any given day, this variation is not significant, in time these variations accumulate into significant differences between apparent solar time and clock time. On a particular day, the sun may be ahead or behind the clocks by as much as sixteen minutes although over the period of a year, the variations, called equation of time, average out to zero. By knowing the declination, the equation of time may be determined from commonly available plots.

In the device of the present invention, these variations may be compensated for, when using a drive motor having an output of one revolution per 24 hours, by adjusting the daily starting time of the drive motor to thereby reflect the annual variation in the equation of time. Alternatively, a variable speed drive motor may be utilized having an output which may be more or less than one revolution per 24 hours or which may be programed to vary its output during a day to compensate for the variations.

As is well known, an incident ray of light striking a reflective surface will reflect in a plane at an angle from a normal from the reflective surface equal to the angle of the incident ray from normal. Thus a ray from the sun on a line S striking a reflective surface having a normal N is reflected on a line T at an angle 0 from normal N equal to the angle between line S and normal N. The components of the device of the present invention are set up such that the center point of the member is on both lines N and T. The intersection of a shaft and block of an offset assembly and the intersection of a shaft and the other block of offset assembly points is on line S. All four offset assemblies are arranged so as to move in parallel with one another and thus each point on the guide frame is offset from a fixed point in space by a fixed length representing line S. Each of the swivel assemblies mounted on the guide frame is then positioned such that the point in space that is offset from the intersection of control rod and block of the assembly is also located the same distance away from the center point of the member that corresponds to the line T for that member. Thus the device is able to reflect rays of the sun S toward a fixed target on a line T by proper adjustment of the normal N from each member.

In operation, the device is positioned such that the edges of the support frame are directed toward the North Star and the adjusting means set to correspond to the declination angle for the particular day. The drive motor is set for the proper rate of rotation and then activated. The device is then able to direct multiple sun images onto a common target area while continually tracking the apparent motion of the sun during a day.

While the present invention has been described with reference to a particular embodiment thereof, it will be understood that numerous modifications may be made by those skilled in the art without actually departing from the spirit and scope of the invention as defined in the appended claims.

I claim:

1. A device adapted for tracking the apparent motion of the sun and reflecting and thereby concentrating rays of the sun to a fixed target area comprising at least two members each having a reflective surface and being rotatably mounted in a frame on an axis which passes through the center point of the member, each frame being rotatably mounted in a common support on an axis which passes through the center point of the member and which is at a right angle to the axis of the member, a control rod having a longitudinal axis attached to the member such that the axis of the rod is normal to the reflective surface and passes through the center point of the member, guide frame means in engagement with each control rod, driving means for moving the guide frame such that each member rotates about one axis and adjusting means for moving the guide frame means such that each member rotates about the other axis.

2. A device according to claim 1 wherein the guide frame means includes a swivel assembly for engagement with each control rod.

3. A device according to claim 2 wherein each swivel assembly comprises a base attached to the guide frame means, a yoke member pivotly mounted to the base plate, and a swivel block pivotly mounted within the yoke member, the swivel block having a bore through which a control rod passes.

4. A device according to claim 1 wherein the guide frame means includes at least two shafts and the driving means includes at least two driven shafts supported by the common support, the shafts of the guide frame means and the shafts of the driving means being connected by offset assemblies.

5. A device according to claim 4 wherein each offset assembly comprises a block mounted on the driven shaft, a block mounted on the shaft of the guide frame means and an offset frame pivotly mounted on each block.

6. A device according to claim 1 wherein the adjusting means comprises an adjustable member connected to the guide frame means and the common support.

7. A device according to claim 1 wherein the driving means includes a variable speed motor.

8. A device according to claim 1 wherein the reflective surface of each member is a mirror.

9. A device according to claim 4 wherein the guide frame means includes a plurality of longitudinal members connected by a plurality of cross members, the longitudinal members being supported by at least two shafts.

10. A device according to claim 9 wherein the swivel assemblies are attached to longitudinal members of the guide frame means.

* * * * *